Aug. 24, 1965   D. WAINBERG   3,202,313
MULTI-CELL CARRIER
Filed Nov. 14, 1962   18 Sheets-Sheet 1

Inventor
Daniel Wainberg
By Cushman, Darby & Cushman
Attorneys

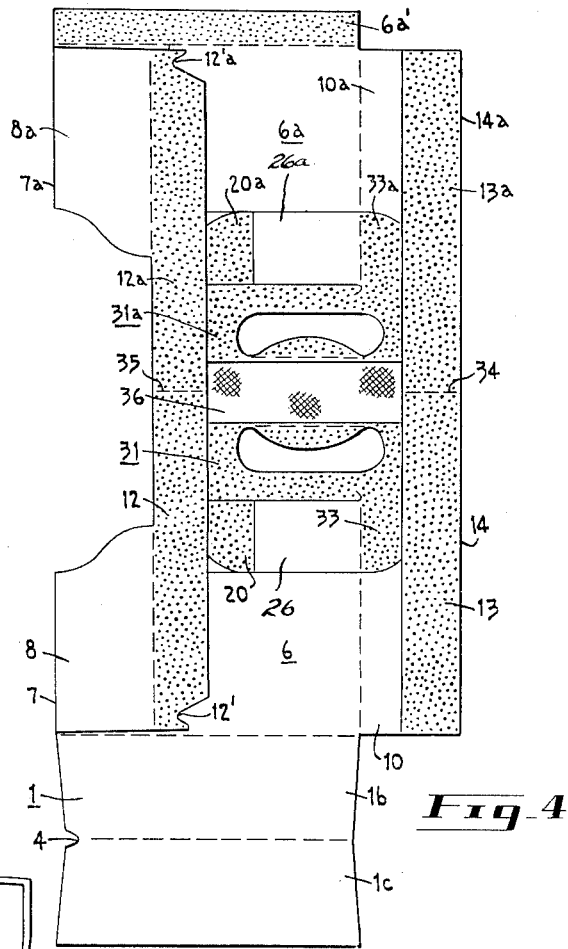
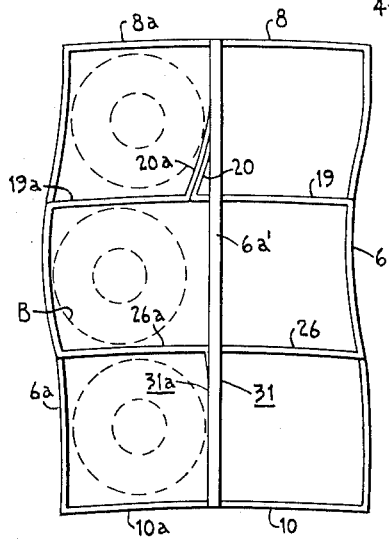

Aug. 24, 1965
D. WAINBERG
3,202,313
MULTI-CELL CARRIER
Filed Nov. 14, 1962
18 Sheets-Sheet 4
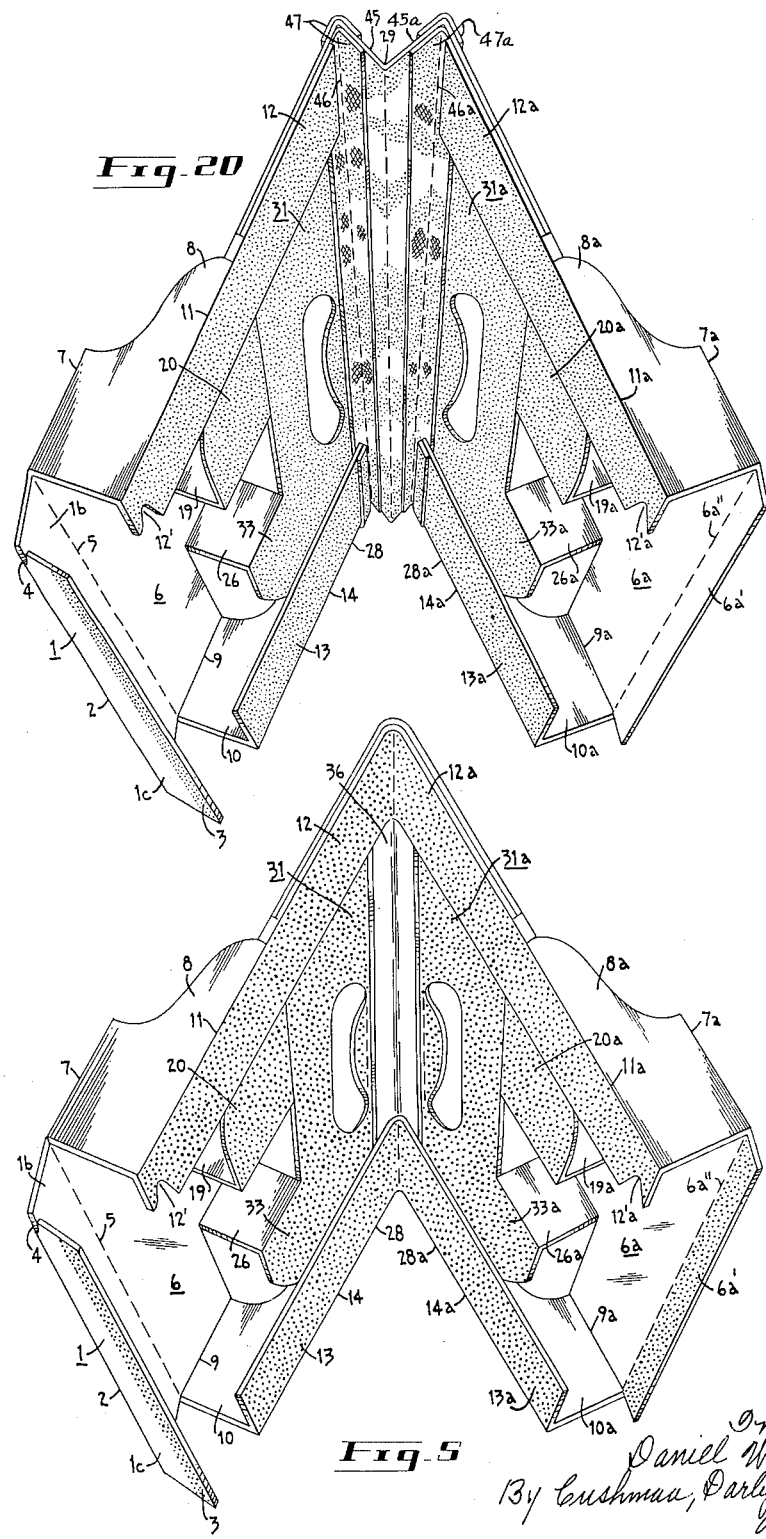

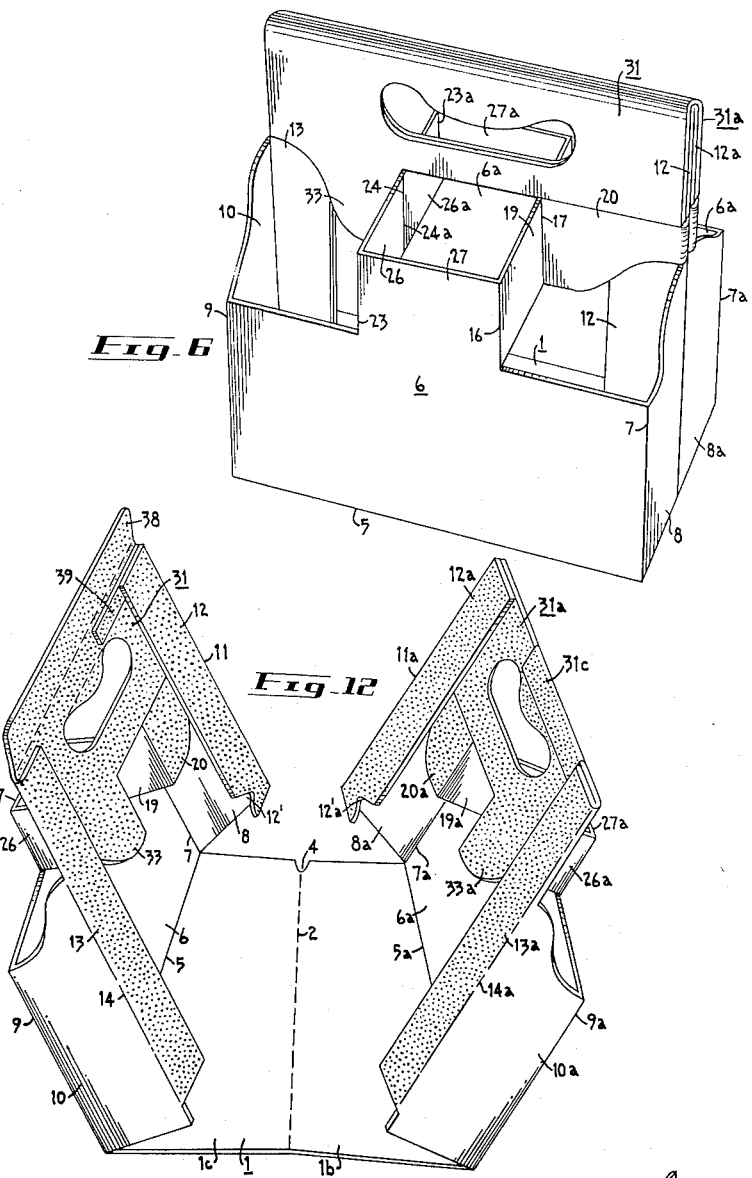

Aug. 24, 1965  D. WAINBERG  3,202,313
MULTI-CELL CARRIER
Filed Nov. 14, 1962  18 Sheets-Sheet 8
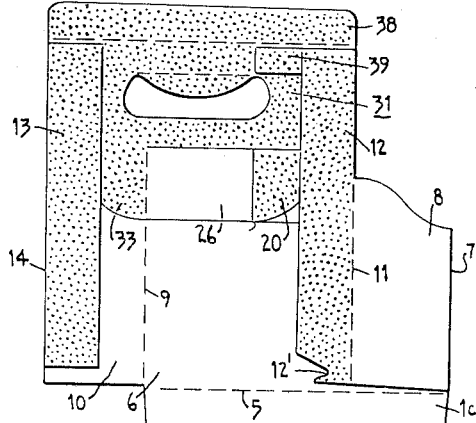
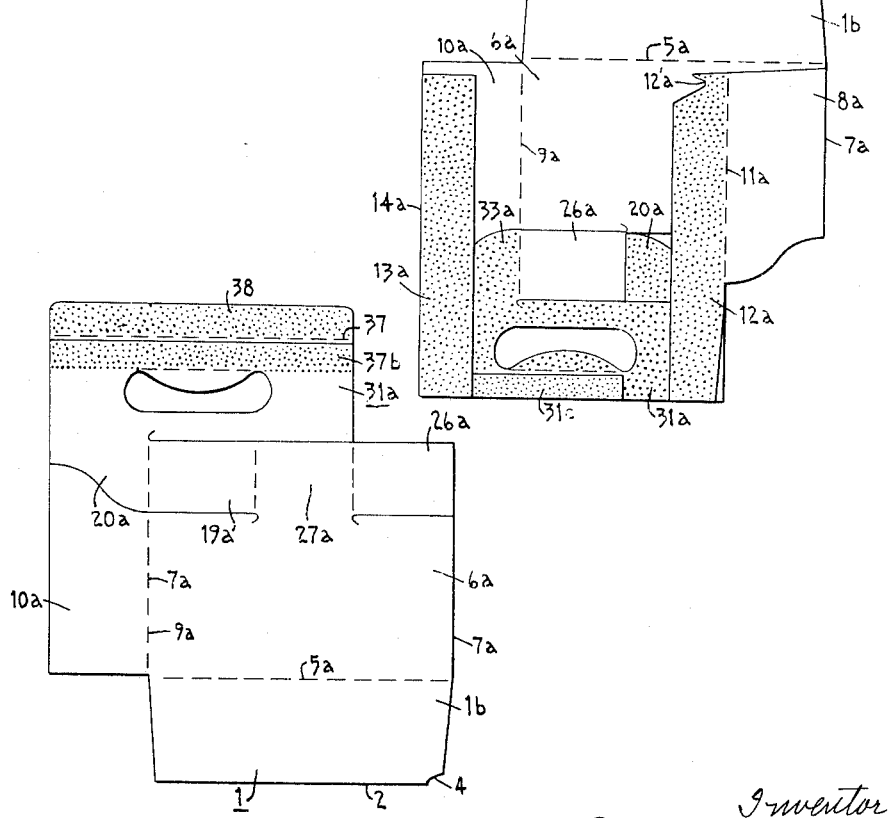
Inventor
Daniel Wainberg
By Cushman, Darby & Cushman
Attorneys

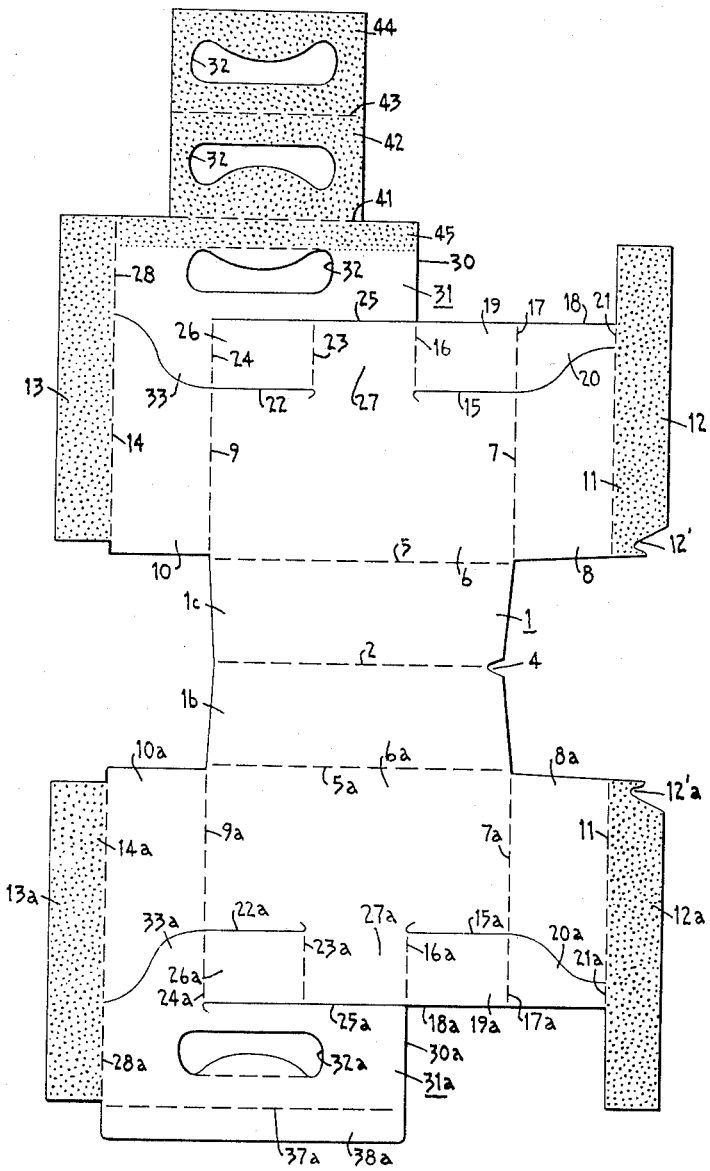

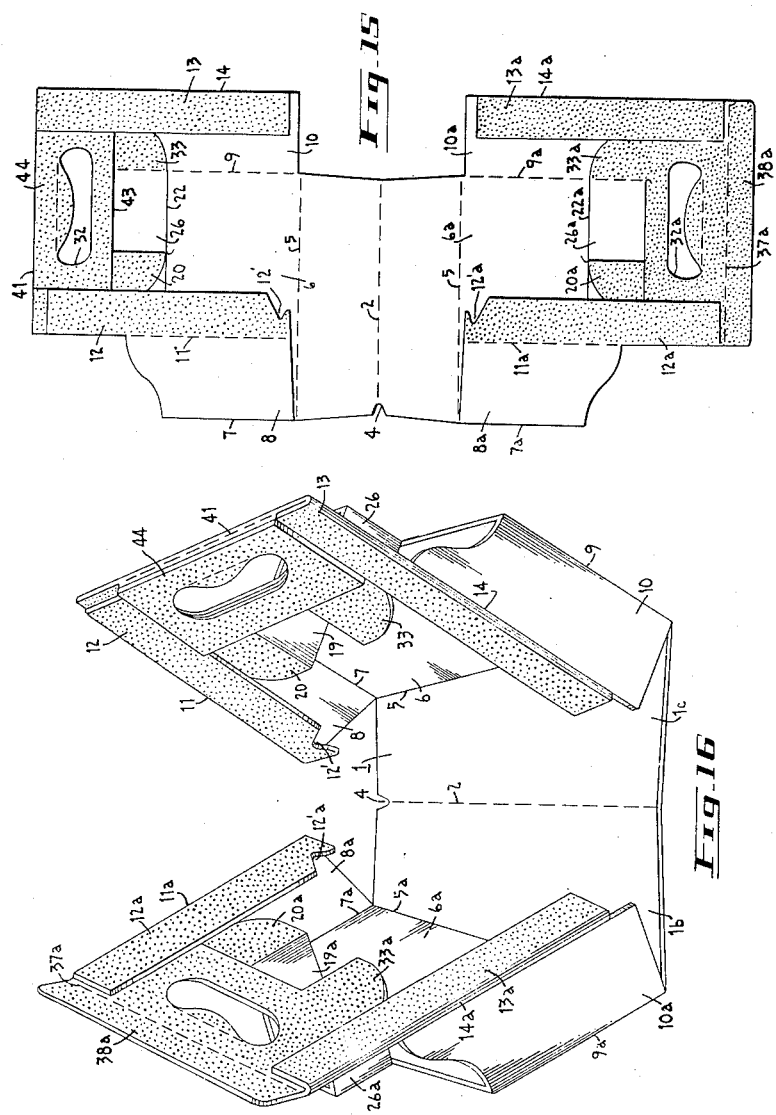

Aug. 24, 1965     D. WAINBERG     3,202,313
MULTI-CELL CARRIER

Filed Nov. 14, 1962     18 Sheets-Sheet 12

Inventor
Daniel Wainberg
By Cushman, Darby & Cushman
Attorneys

Aug. 24, 1965 D. WAINBERG 3,202,313
MULTI-CELL CARRIER
Filed Nov. 14, 1962 18 Sheets-Sheet 13

Inventor
Daniel Wainberg
By Cushman, Darby & Cushman
Attorneys

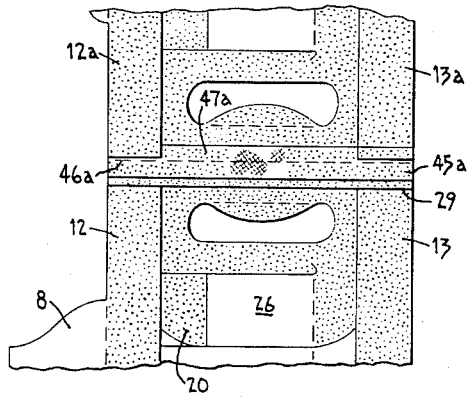
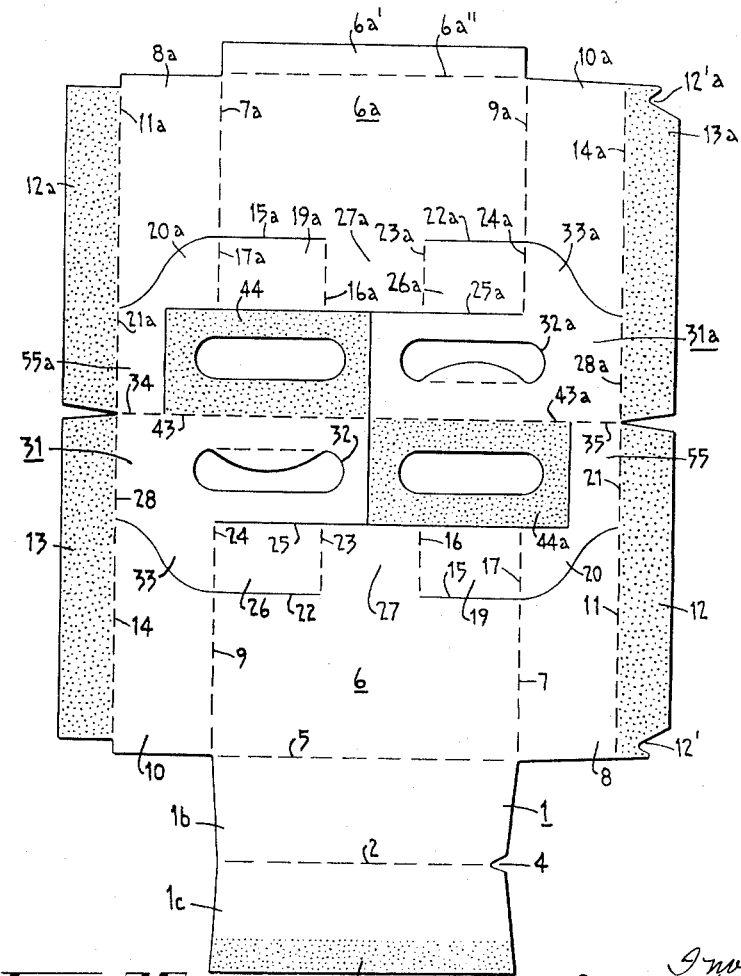

Aug. 24, 1965    D. WAINBERG    3,202,313
MULTI-CELL CARRIER
Filed Nov. 14, 1962    18 Sheets-Sheet 15

Inventor
Daniel Wainberg
By Cushman, Darby & Cushman
Attorneys

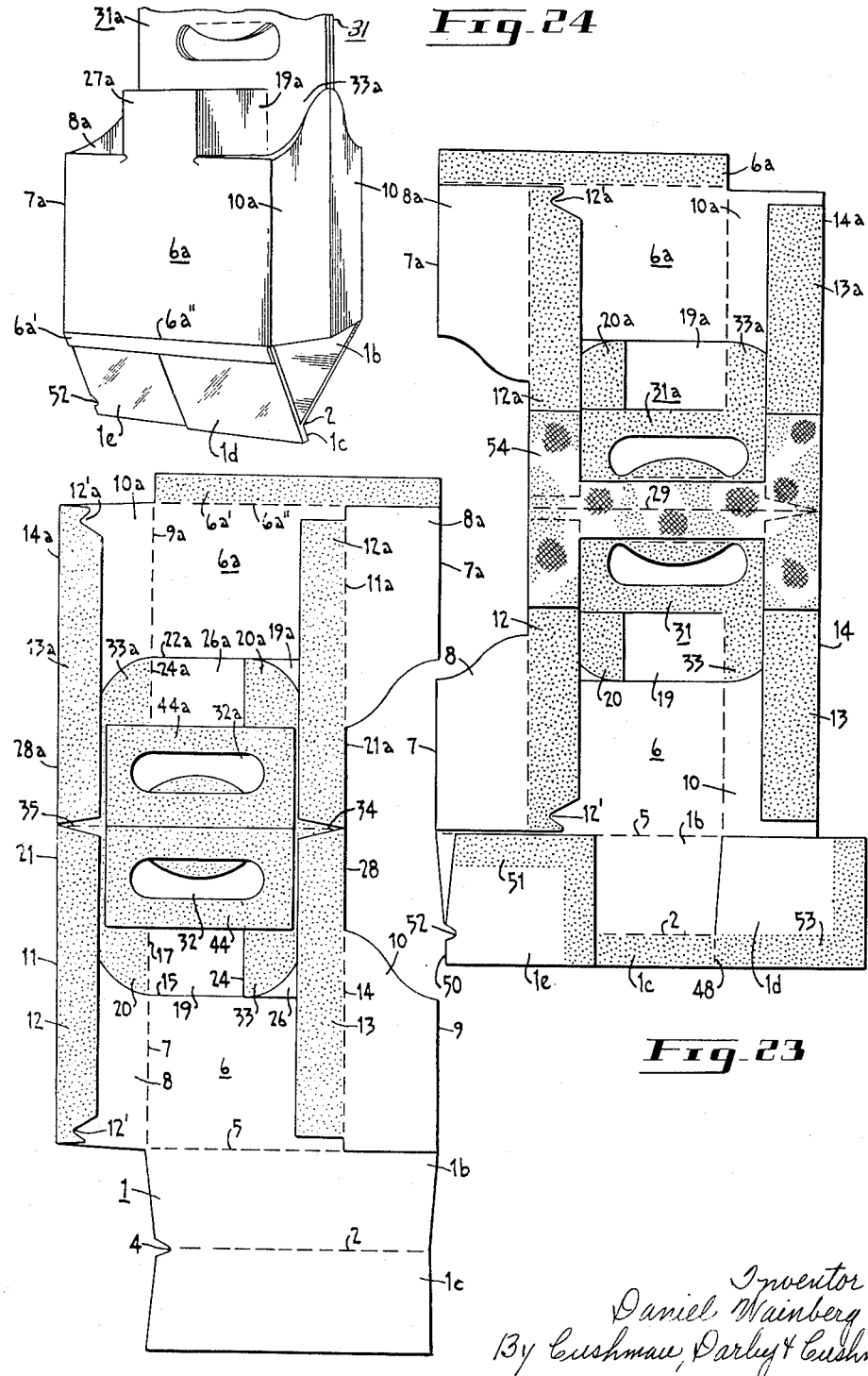

Aug. 24, 1965　　　D. WAINBERG　　　3,202,313
MULTI-CELL CARRIER

Filed Nov. 14, 1962　　　　　　　　18 Sheets-Sheet 17

Inventor
Daniel Wainberg
By Cushman, Darby Cushman
Attorneys

Aug. 24, 1965

D. WAINBERG 3,202,313

MULTI-CELL CARRIER

Filed Nov. 14, 1962

Inventor
Daniel Wainberg
By Cushman, Darby & Cushman
Attorneys

United States Patent Office 3,202,313
Patented Aug. 24, 1965

3,202,313
MULTI-CELL CARRIER
Daniel Wainberg, Westmount, Quebec, Canada
Filed Nov. 14, 1962, Ser. No. 237,686
Claims priority, application Canada, Aug. 3, 1962,
855,189
28 Claims. (Cl. 220—113)

This invention relates to multi-cell carriers suitable for carrying fragile articles such, for example, as glass bottles.

With hitherto known multi-cell carriers, the pairs of transverse partitions, intermediate the mutually opposed end walls of the carrier, have been integrally and hingedly connected, at one end thereof, to an associated and adjacent side wall and, at the other end, integrally and hingedly connected to the panels constituting the carrying handle.

However, such constructions have had the disadvantage that, because the intermediate transverse partitions have been integrally and hingedly connected to the handle carrying panels, the said hingeable connections have torn upon mis-use or rough handling of the carrier. Such tearing has materially reduced the rigidity and overall strength of the carrier and, moreover, adjacent glass bottles have contacted one another and breakage thereof has resulted.

The object of the present invention, therefore, is to overcome the above disadvantage by providing means integral with the carrier whereby the inertial torque will be resiliently taken up on movement of the articles in the carrier about the vertical axis of the latter, with respect to the handle panel members, when said multi-cell carrier is being carried.

According to one aspect, the present invention relates to a multi-cell carrier comprising a bottom; a pair of mutually opposed side walls each hingedly connected to an associated marginal side edge of said bottom; a pair of mutually opposed end walls each constituted by a pair of end wall panels each integrally and hingedly connected to an associated vertical terminal edge of an associated said side wall; first and second pairs of vertical post members, the members of each said pair being secured together; each said member, of said pairs thereof, being hingedly and integrally connected to an associated vertical terminal edge, remote from said associated side wall, of an associated said end wall panel; at least a pair of primary handle panel members each integrally and hingedly connected to an associated one of said first pair of vertical post members and secured in face-to-face contact therewith adjacent one end thereof; the members of each said pair of vertical post members being secured in face-to-face contact with one another and extending from adjacent the upper edge of the said primary handle panel members to substantially adjacent the lower edge of the said end wall panels; two pairs of spaced parallel transverse partitions; each said pair of transverse partitions, at one end thereof, being integrally and hingedly connected to an associated adjacent said wall adjacent the upper edge of the latter; the other end of one of said transverse partitions, in each pair thereof, being integrally and hingedly connected to an associated said primary handle panel member; a pair of connecting members; one end of said connecting members being integrally and hingedly connected to the other end of the remaining transverse partition in each pair thereof; each said connecting member, at its other end, being integrally and hingedly connected to an associated one of said second pair of vertical post members; said secured pairs of vertical post members, said secured pair of primary handle panel members, and said connecting members thereby forming a combined longitudinal partition and carrying handle extending along, and adjacent to, the central longitudinal axis of the carrier; each said pair of transverse partitions extending normal to, and between, said combined longitudinal partition and carrying handle and an adjacent said side wall; each said connecting member being coplanar with an adjacent primary handle panel member and having a selected edge extending parallel with, and adjacent to, a lower edge of its said adjacent primary handle panel member, said selected edge defining a line of rupture; whereby, when said multi-cell carrier is being carried and upon movement of the contents of the carrier about the vertical axis of the latter, inertial torque is resiliently taken up by each said connecting member along its defined line of rupture thereby inhibiting rupture of the connections between the transverse partitions and the combined longitudinal partition and carrying handle.

According to another aspect, the present invention relates to a one-piece blank adapted to form a multi-cell carrier, said carton being cut and scored to provide:

(a) A pair of side wall panels, each end of each said panel being integrally and hingedly connected to (b) An associated end wall panel;

(c) An end flap integrally and hingedly connected to each said end wall panel, remote from the associated side wall panel; each said end wall panel being adapted, upon hinging with respect to its said associated side wall panel, to extend normal thereto, and each said end flap being adapted, upon hinging with respect to its said associated end wall panel on erection of the carrier, to extend normal thereto and parallel with and spaced from the associated side wall panel; adjacent pairs of said end flaps being adapted to be secured together and, upon said erection, to extend along and adjacent to the central longitudinal axis of the carrier;

(d) A pair of primary handle panel members each integrally and hingedly connected to an associated one of a selected pair of said end flaps and adapted, to be secured together in face-to-face contact and to be secured in face-to-face contact with said pairs of end flaps and, upon said erection, to extend along and adjacent to the said central longitudinal axis;

(e) Two pairs of transverse partition panels, a selected one of each said pair being integrally and hingedly connected, at one end thereof, to an associated said primary handle panel and, at its other end, being integrally and hingedly connected to an associated said side wall panel, each said selected one transverse partition panel being adapted, upon hinging with respect to its associated primary handle panel and side wall panel and upon said erection, to extend normal to, and between, said last-mentioned pair of panels;

(f) A pair of connecting member panels each integrally and hingedly connected at one end to an associated one of the other pair of end flaps, the remaining end of each said connecting member panel being integrally and hingedly connected to one end of the remaining one transverse partition panel in each pair thereof; the other end of each said remaining one transverse partition panel being integrally and hingedly connected to the same side wall panel connecting the selected one transverse partition each upper edge of said connecting panel member measured from the hinged transverse partition panel connection toward the associated end flap, being of complementary construction though physically removed from the lower adjacent edge of the adjacent primary handle panel member, and adapted to meet with and lie in the same plane as the lower adjacent edge of the adjacent primary handle panel member upon construction of the carton; each said remaining one transverse partition being adapted, upon hinging with respect to its associated connecting member panel and side wall panel and upon said erection, to extend normal to, and between, said last-mentioned pair of panels; each said connecting member panel being adapted, upon hinging with respect to its associated end flap and remaining one transverse partition, and upon said erection, to extend along and adjacent to the said central longitudinal axis and to be coplanar with an adjacent primary handle panel member and having a selected edge extending parallel with, and adjacent to, a lower edge of its said adjacent primary handle panel member, said selected edge defining a line of rupture; said pairs of connecting member panels, end flaps, and primary handle panel members, upon said erection, forming a combined longitudinal partition and carrying handle extending along and adjacent to said longitudinal axis; and (g) A bottom panel having a pair of mutually opposed side edges at least one of which is integrally and hingedly connected to a selected one of said side wall panels; said side wall panel being adapted, upon hinging with respect to said bottom panel and upon said erection, to extend normal to the latter; the remaining side wall panel, also being hingedly connected to said bottom and, upon said erection, extending normal to the latter; whereby (h) When said carrier is in said erected condition and being carried, and upon movement of the contents of the carrier about the vertical axis of the latter, inertial torque is resiliently taken up by each said connecting member along its defined line of rupture thereby inhibiting rupture of the connections between the transverse partitions and the combined longitudinal partition and carrying handle.

The invention is illustrated, by way of example, in the accompanying drawings in which:

FIGURE 4 shows one stage in the assembly of a knock-down multi-cell carrier formed by the first type of one-piece blank shown in FIGURES 1 and 2 and incorporating the reinforcement member shown in FIGURE 3;

FIGURE 5 is a partially exploded view of the multi-cell carrier formed by the first type of one-piece blank shown in FIGURES 1 and 2;

FIGURE 6 is a perspective view of an erected multi-cell carrier formed by the first type of one-piece blank of FIGURES 1 and 2;

FIGURE 7 is a plan view of the erected multi-cell carrier shown in FIGURE 6;

FIGURES 10 and 11 show steps in the assembly of a knock-down multi-cell carrier formed by the second type of one-piece blank shown in FIGURES 8 and 9;

FIGURE 12 is a partially exploded view of the multi-cell carrier formed by the second type of one-piece blank shown in FIGURES 8 and 9;

FIGURE 13 is a plan view of a third type of one-piece blank adapted to form a multi-cell carrier;

FIGURE 15 shows a stage in the assembly of the third type of multi-cell carrier to its knock-down form;

FIGURE 16 is a partially exploded view of the third type of multi-cell carrier formed by the one-piece blank shown in FIGURES 13 and 14;

FIGURE 19 shows a stage in the assembly of the fourth type of multi-cell carrier to its knock-down form;

FIGURE 20 is a partially exploded view of the fourth type of multi-cell carrier formed by the one-piece blank shown in FIGURES 17 and 18;

FIGURE 23 shows a stage in the assembly of the fifth type of multi-cell carrier to its knock-down form;

FIGURE 24 is a perspective view of the fifth type of multi-cell carrier, shown partially erected, formed by the one-piece blank shown in FIGURES 21 and 22;

FIGURE 25 is a plan view of the sixth type of one-piece blank adapted to form a multi-cell carrier;

FIGURES 27 and 28 show stages in the assembly of the sixth type of multi-cell carrier to its knock-down form.

Figure 1:
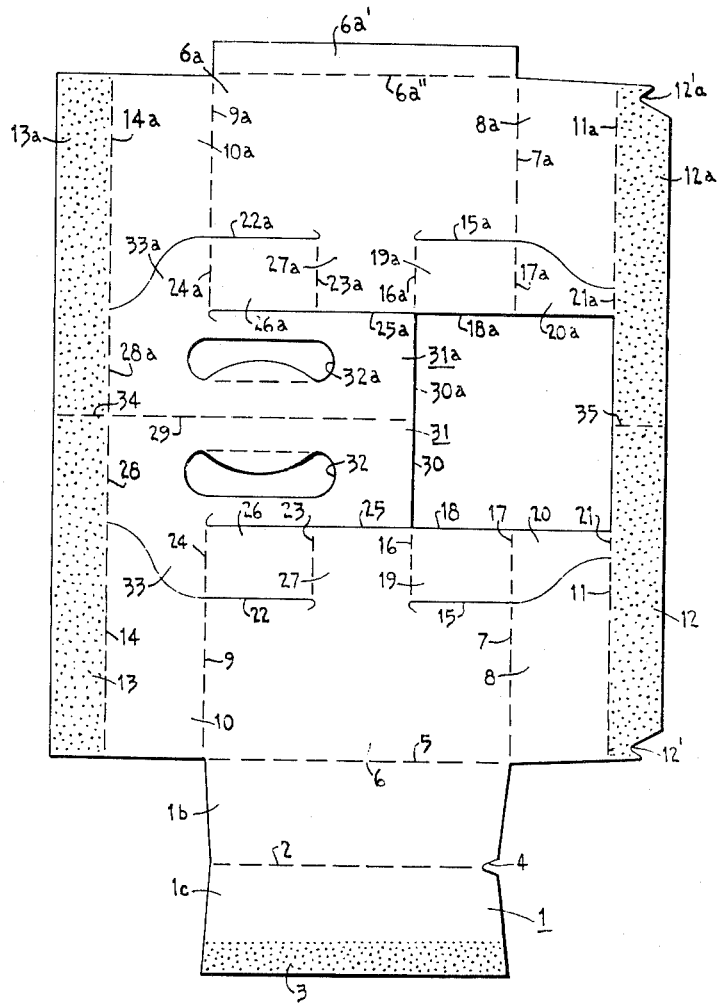
FIGURE 1 is a plan view of a first type of one-piece blank adapted to form a multi-cell carrier.
Figure 2:
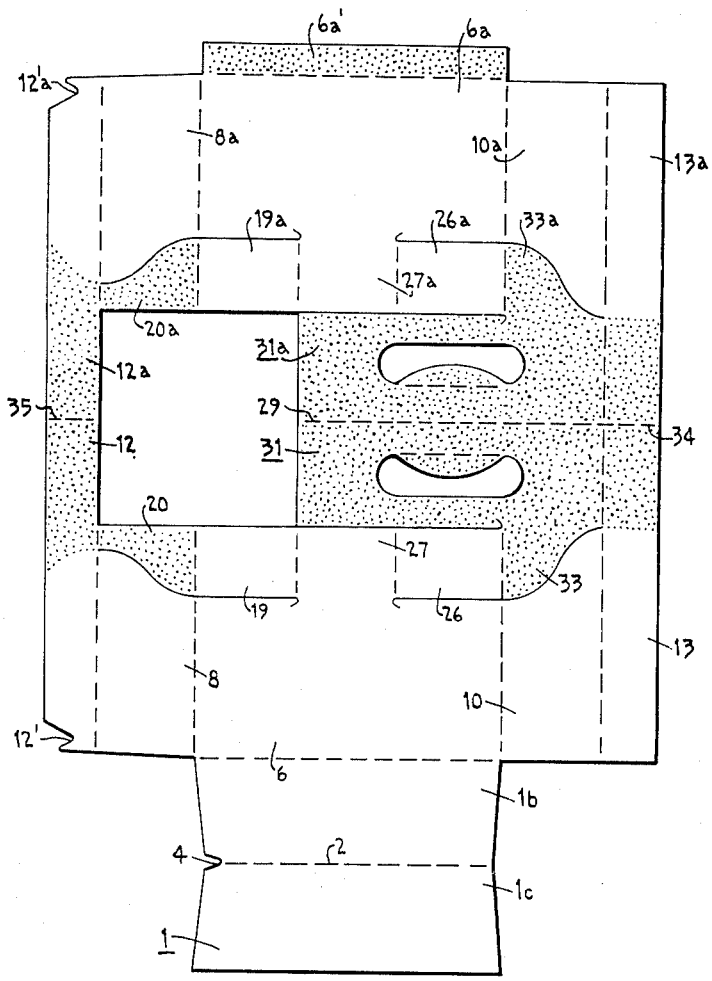
FIGURE 2 is a view similar to FIGURE 1 but showing the obverse face of the first type of one-piece blank.

Referring to the drawings, a first multi-cell carrier is formed from the one-piece blank of cardboard shown in FIGURES 1 and 2.

One-half of the blank is cut and scored to provide a main panel, indicated generally at 1 and ultimately forming the bottom of the carrier, having a medial score line 2 dividing said panel 1 into a pair of sub-panels 1b, 1c. One face of sub-panel 1c is provided with a strip 3 of pressure sensitive adhesive, preferably employed throughout the construction of the multi-cell carrier to its knockdown form, extending along its free marginal side edge as is shown in FIGURE 1. A notch 4, the purpose of which will be apparent hereinafter, is provided in one terminal end edge of panel 1, the longitudinal axis of said notch 4 preferably being in alignment with the medial score line 2.

The side edge, remote from the medial score line 2, of panel 1b, is integrally and hingedly connected, by a common score line 5 parallel with and spaced from, said medial score line 2, to a side wall panel 6. The mutually opposed terminal ends of the side wall panel 6 are each defined by a common score line 7, 9, respectively, integrally and hingedly connecting said side wall panel 6 to spaced end wall panels 8, 10.

End panel 8 is integrally and hingedly connected, by means of a common score line 11, to an end flap 12 provided with a hook-shaped extension 12' at its free end. End panel 10 is integrally and hingedly connected, by means of a common score line 14, to an end flap 13.

The blank is also provided with a first pair of incisions 15, 22. One end of incision 15 terminates at the common score line 11, said incision 15 extending, preferably in a curve, across the entire width of end wall panel 8 and terminating at a score line 16 parallel with score line 11. An extension 17 of the common score line 7, spaced from, and parallel with the score line 16, extends normal to that portion of said incision 15 located between said extension 17 and the score line 16. Thus, that portion of the blank bounded by said portion of the incision 15, the score line 16, the extension 17 and an edge 18 of the blank, forms a transverse partition panel 19. At the same time, the portion of the blank bounded by the curved portion of the incision 15, the extension 17, the edge 18 and an extension 21 of the common score line 11, forms a first connecting panel member 20.

One end of the other incision 22 terminates at the common score line 14, said incision 22 extending, preferably in a curve, across the entire width of the end wall panel 10 and terminating at a score line 23 parallel with score line 14. An extension 24 of the common score line 9, spaced from and parallel with the score line 23, extends normal to that portion of the incision 22 located between the extension 24 and the score line 23. Thus, that portion of the blank bounded by said portion of the incision 22, the score line 23, the extension 24, and an incision 25 in alignment with the edge 18, forms a further transverse partition panel 26. That portion 27 of the blank bounded by the incision 25 and the score lines 16 and 23 forms an extension of the side wall panel 6.

The common score line 14 is provided with an extension 28 from the junction of the incision 22 with said common score line 14 to a common score line 29 normal to the latter.

Accordingly, that portion of the blank bounded by the incision 25, the score line extension 24, the curved portion of the incision 22, the score line extension 28, the common score line 29, and an edge 30 normal to the incision 25 forms a first primary handle panel member, indicated generally at 31, of a pair thereof. The first primary handle panel 31 is provided with a hand carrying aperture 32 and an extension 33, the latter being bounded by the curved portion of incision 22 and the score line extension 24.

The common score line 29 is also provided with an extension 34 in alignment therewith. A further score line 35, spaced from and in alignment with the said score line 29 is also provided.

With the exception of one difference, about to be described, the other half of the blank is similar to the first half just described in detail and, accordingly, it is felt to be unnecessary to describe it in any great detail. However, the second half of the blank has been given the same reference numerals as the first half, with the exception that they each have the suffix of a as will be apparent from the drawings.

The second half of the blank merely differs from the first half in that side wall panel 6a is provided with a flap 6a' extending throughout its length and integrally and hingedly connected thereto along a common score line 6a''.

As will be seen from reference to FIGURE 1, preferably one entire face of each of the end flaps 12, 12a, 13 and 13a is coated with pressure sensitive adhesive whereas, as will be seen from FIGURE 2, only a portion of the obverse face of each of said end flaps is similarly coated. Moreover, and as will also be seen from FIGURE 2, preferably the entire obverse face of each connecting member panel 20, 20a, and each primary handle panel 31, 31a as well as the associated extension 33, 33a respectively, is coated with pressure sensitive adhesive.

Figure 3:
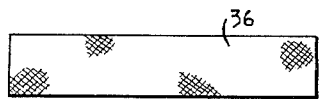
FIGURE 3 is a plan view of a handle reinforcement member preferably employed with the blank of FIGURES 1 and 2.

To assemble a multi-cell carrier to its knock-down condition from the blank shown in FIGURES 1 and 2, a handle strengthening or reinforcing member 36 shown in FIGURE 3 is preferably incorporated in said carrier. The reinforcing member may be of nylon tape or it may be of cardboard, but if it is constituted by the latter, then it is provided with a score line extending along its central longitudinal axis to facilitate bending of said member. The reinforcing member 36 is of such dimensions as to extend over the pair of primary handle panels 31, 31a from end to end thereof and between the hand carrying apertures 32, 32a.

Accordingly, after such a reinforcing member 36 has been positioned on the blank so that it partially covers portions of the primary handle panels 31, 31a, each end wall panel section 8, 8a, is folded along the associated common score line 7, 7a respectively. Simultaneously, the first transverse partition panels 19, 19a hinge about the score line 16, 16a as well as the extension score line 17, 17a. At the same time, the connecting panel members 20, 20a hinge about the extension score lines 17, 17a and 21, 21a. Thus, as is shown in FIGURE 4, the first transverse partition panels 19, 19a will be superposed on the associated extension 27, 27a of the side wall panels 6, 6a, each connecting panel member 20, 20a will be superposed on the associated first transverse partition panel 26, 26a with its coated surface uppermost, and the end flaps 12, 12a will be superposed on the connecting panel member panels 20, 20a.

Concurrently, each of the end flaps 13, 13a is folded about the associated common score line 14, 14a so as to be superposed partially on the primary handle panels 31, 31a and the end wall panels 10, 10a, as is also shown in FIGURE 4.

Thereafter, the bottom panel is folded along the median score line 2 thereby bringing sub-panel 1c uppermost and superposed on sub-panel 1b.

Finally, the blank is folded along the score lines 29, 34 and 35 so as to bring the coated face of tab 6a' into registry with the coated strip 3 of sub-panel 1c, and the coated surfaces of the first half of the blank into registry with the correspondingly coated surfaces of the other half of the blank. Suitable pressure is then brought to bear upon the blank so as to bring about adhesion between the said coated surfaces.

As will be seen more clearly from FIGURE 5, major portions of the primary handle panels 31, 31a and their extensions 33, 33a will be directly connected together whereas minor portions thereof, located at the ends of said panels 31, 31a will be directly connected to the upper portions of the end flaps 12, 12a, and 13, 13a. On the other hand, minor portions of the connecting panel members 20, 20a will be directly connected to the end flaps 12, 12a whereas major portions of said connecting panel members 20, 20a, will be preferably directly connected together.

It will be appreciated that when, as is shown in FIGURE 6, a knock-down carrier is erected for filling purposes, the said carrier will have a bottom, constituted by the bottom panel 1, a pair of mutually opposed side walls 6, 6a, each hingedly connected to an associated marginal side edge of the bottom along the respective common fold lines 5 and 6a''. The carrier will also have a pair of mutually opposed end walls each constituted by a pair of associated end wall panels 8, 8a and 10, 10a, each of said panels being integrally and hingedly connected to an associated vertical terminal edge, along respective common score lines 7, 7a, and 9, 9a, of an associated side wall 6, 6a.

When the carrier is erected, each of the secured pairs of end flaps 12, 12a and 13, 13a respectively form first and second pairs of vertical post members each integrally and hingedly connected to an associated vertical terminal edge, along the common score lines 11, 11a, 14, 14a, respectively, of an associated end wall panel. Moreover, each of the vertical post members 13, 13a, constituting the first said pair thereof, is respectively integrally and hingedly connected to a primary handle panel member 31, 31a along the score line extensions 28, 28a adjacent one end of each said primary handle panel member. Each of the first pair of vertical post members 13, 13a extend from adjacent the upper edge of its associated primary handle panel member substantially to adjacent the lower edge of the associated end wall panels 10, 10a.

The erected carrier will also have two pairs of spaced parallel transverse partitions, one pair thereof being constituted by panels 19, 26 and the other pair of panels 19a, 26a, each said pair extending normal to and between a said primary handle panel member and an adjacent side wall. The transverse partition 26 is integrally and hingedly connected, at one end thereof, to the adjacent side wall 6 along the score line 23 and, at its other end and by means of extension score line 24, to the primary handle panel member 31. Similarly, transverse partition 26a is integrally and hingedly connected, at one end thereof and by means of score line 23a, to the adjacent side wall 6a, and, at its other end, and by means of extension score line 24a, to the primary handle panel member 31a.

Transverse partition 19 is integrally and hingedly connected, at one end thereof and by means of score line 16, to the adjacent side wall 6 and, at its other end and by means of score line extension 17, to one end of the associated connecting member 20. The transverse partition 19a is integrally and hingedly connected, at one end thereof and by means of score line 16a, to the adjacent side wall panel 6a and, at its other end and by means of score line extension 17a, to one end of the associated connecting member 20a. As will also be appreciated, the other end of each said connecting member 20, 20a is integrally and hingedly connected, by means of score line extension 21, 21a respectively, to an associated one of the second pair of vertical post members, the latter being constituted by the secured pair of end flaps 12, 12a.

As will be seen more clearly from FIGURE 6, each depending extension 33, 33a of the primary handle panel members 31, 31a is normal to and extends between, respectively, the transverse partitions 26, 26a and the adjacent end wall panels 10, 10a.

When the carrier is erected, the hook-shaped extension 12', 12a' on the first pair of vertical post members 12, 12a are adapted to engage the notch 4 in the bottom panel 1 so as to assist in maintaining said carrier in its erected condition.

Thus, when the carrier is erected, the secured pairs of vertical post members, the secured primary handle panel members 31, 31a, the secured downward extensions 33, 33a, and the detachably adhesively secured connecting members 20, 20a, form a combined longitudinal partition and carrying handle extending along, and adjacent to, the central longitudinal axis of the carrier so as to divide the interior of said carrier into a pair of identical article receiving rows. As the transverse partitions extend normal to, and between, the combined longitudinal partition and carrying handle on the one hand, and the adjacent side wall on the other, each said row will be subdivided into a plurality of article receiving compartments.

Each connecting member 20, 20a will thus be coplanar with an adjacent primary handle panel member, connecting member 20 being, as is shown in FIGURE 6, coplanar with primary handle panel member 31. Moreover, the upper horizontal, or selected, edge of each connecting member will extend parallel with, and adjacent to, a lower edge of its said adjacent primary handle panel member such for example, as connecting member 20 and handle member 31 are disposed in FIGURE 6. Each said horizontal, or selected, edge will thus define a line of rupture.

As has been previously mentioned, one of the difficulties experienced with hitherto known carriers has been that when said carrier has been filled with articles and carried by hand and due to each transverse partition being integrally and hingedly connected to an associated primary handle panel, the inertial torque has not been resiliently taken up on movement of the said articles brought about by rough handling of the carton. Consequently, such movement of the articles has caused the said integral connection between the transverse partitions and the primary handle panels to rupture. Such rupturing has seriously weakened the carton and, at the same time, fragile articles, such e.g. as glass bottles indicated at B in FIGURE 7, in adjacent compartments of the same row, have contacted one another and have broken.

The present invention, however, assists in overcoming this disadvantage due to the fact that one of each pair of transverse partitions in the same row is not integrally connected to the associated primary handle panel but, instead, it is integrally and hingedly connected to an associated connecting member. As major portions of both connecting members 20, 20a are preferably directly secured together and are not integrally and hingedly connected to the primary handle panel members, the above-mentioned inertial torque will be resiliently taken up on movement of the articles B about the vertical axis of the carrier with respect to the primary handle panel members 31, 31a, and when the multi-cell carrier is being carried. FIGURE 7 shows, greatly exaggerated for illustrative purposes, how the pair of connecting members 20, 20a move out of their normal vertical plane resiliently to take up the inertial torque thereby obviating the risk of rupture of their associated transverse partitions. The inertial torque is also resiliently taken up by each said connecting member along each defined line of rupture of the latter.

Figure 8:
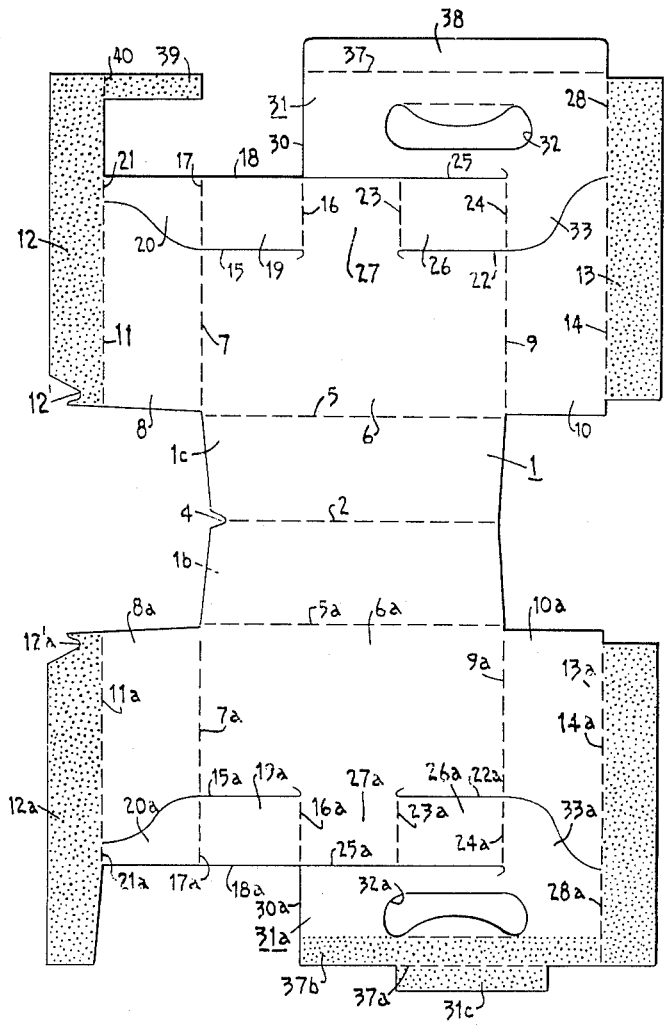
FIGURE 8 is a plan view of a second type of one-piece blank adapted to form a multi-cell carrier.
Figure 9:
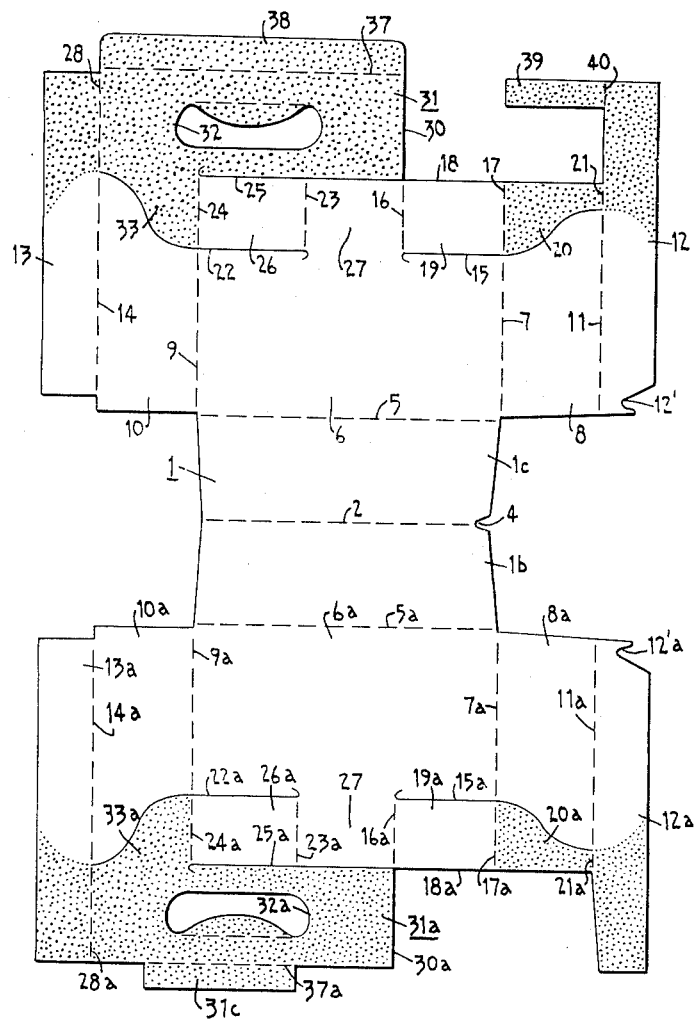
FIGURE 9 is a similar view to FIGURE 8 but showing the obverse face of the one-piece blank shown in FIGURE 8.

An alternative form of one-piece blank for forming a multi-cell carrier is shown in FIGURES 8 and 9 and, insofar as is possible, like reference numerals have been employed.

As will be seen from reference to FIGURES 8 and 9, one side edge of bottom panel 1 is integrally and hingedly connected, along common score line 5, to side wall panel 6, and the other side edge of said bottom panel 1 is integrally and hingedly connected, along common score line 5a, to side wall panel 6a.

The primary handle panel 31, associated with side wall panel 6 is integrally and hingedly connected, along a score line 37, to a top flap 38 extending throughout its length.

End flap 12, integrally and hingedly connected to end wall panel 8, is provided with a first reinforcing handle panel 39 integrally and hingedly connected thereto along a score line 40.

The primary handle panel 31a, associated with side wall 6a is integrally and hingedly connected, along a score line 37a, to a second reinforcing handle panel 31c.

Other than the above-mentioned features, both halves of the blank shown in FIGURES 8 and 9 are identical with one another and possess the same characterising features as the first type of blank shown in FIGURES 1 and 2.

As will be noted from FIGURE 8, one face of primary handle panel 31a is provided with a strip 37b of pressure sensitive adhesive adjacent to the score line 37a as is the entire face of each end flap 12, 12a, 13, 13a, as well as the handle reinforcing members 39 and 31c. On the other hand, and as will be noted from FIGURE 9, only portions of the obverse face of each said end flap 12, 12a, 13, 13a is so coated, whereas the entire obverse face of each handle reinforcing member 39, 31c and connecting panel members 20, 20a is coated with pressure sensitive adhesive, as is the entire obverse face of each primary handle panel 31, 31a and the top flap 38.

In forming a knock-down multi-cell carrier from the blank shown in FIGURE 9, the first handle reinforcing member 39 is folded along the score line 40 so as partially to overlie the end flap 12, and the second handle reinforcing member 31c is folded along its associated score line 37a so as to overlie a portion of the second primary handle panel member 31a.

Thereafter, as is shown in FIGURE 10, the end wall panels 8, 8a are respectively hinged along score lines 7, 7a whereby the end flaps 12, 12a partially overlie the primary handle panels 31, 31a as well as the side wall panels 6, 6a. Concurrently, end flaps 13, 13a are respectively hinged along score lines 11, 11a so as partially to overlie said primary handle panels 31, 31a and the end wall panels 10, 10a.

Thereafter, the lower half of the blank shown in FIGURE 10 is folded along the median score line 2 and superposed on the upper half, as is shown in FIGURE 11. Finally, the top flap 38 is folded along score line 37 so that its coated surface will be in registry with the coated strip 37b on primary handle panel 31a. Pressure is then applied to bring about adhesion between the coated portions and to form the knock-down multi-cell carrier. As will be seen from FIGURE 12, the first and second handle reinforcing members 31c and 39 will, when the carrier is either in its knock-down condition or when erected, be in alignment with one another and will be located between the pair of primary handle panel members.

Figure 14:
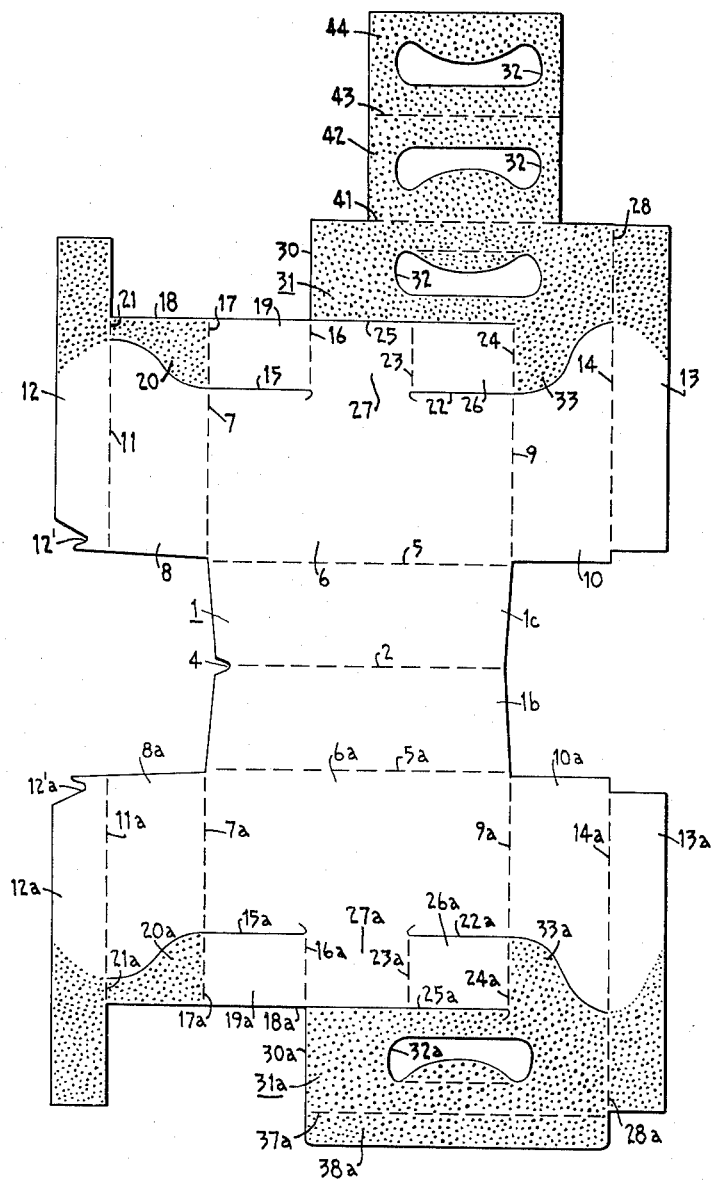
FIGURE 14 is a view similar to FIGURE 13 but showing the obverse face of the third type of one-piece blank.

A multi-cell carrier embodying the features of the present invention can also be formed from the one-piece blank shown in FIGURES 13 and 14 which is somewhat similar to the type of blank shown in FIGURES 9 and 10, with the exception that the handle panel reinforcing members 39, 31c are omitted.

As will be seen from FIGURES 13 and 14, the primary handle panel 31a is provided with a flap 38a, coated on its obverse face with adhesive as is shown in FIGURE 14, integrally and hingedly connected thereto along a common score line 37a.

The primary handle panel member 31 is integrally and hingedly connected, by means of a common score line 41, to a first handle reinforcing member 42 which is, in turn and by means of a common fold line 43, integrally and hingedly connected to a second handle reinforcing member 44. As will be seen from FIGURE 13, a strip of adhesive 45 is provided on the primary handle panel member 31 extending along and adjacent to the common fold line 41. Both faces, as will be seen from FIGURES 13 and 14, of the handle reinforcing members 42, 44, are coated with pressure sensitive adhesive.

To assemble a knock-down multi-cell carrier from the blank shown in FIGURES 13 and 14, the second handle reinforcing member 44 is folded along the score line 43 so that it overlies the first handle reinforcing member 42. The latter is then folded along the score line 41 so that it partially overlies the first primary handle panel 31. Thereafter, end wall panel 8 is folded along score line 7 so that said panel, as well as flap 12 partially overlie side wall panel 6. Flap 13 is also folded along score line 14 so as partially to overlie end wall panel 10. End wall panel 8a is folded along score line 7a so that said panel, as well as flap 12a partially overlies side wall panel 6a. The flap 13a is also folded along score line 14a so as partially to overlie the side wall panel 6a. The stage of assembly so far described is shown in FIGURE 15.

Finally, the lower half of the blank shown in FIGURE 15 is folded along the median score line 2 so that it overlies the upper half and the flap 38a of primary handle panel 31a is folded along score line 37a and over the upper ends of the two handle reinforcing members 42, 44 whereupon its coated face will be in registry with the adhesive strip 45 on the primary handle panel 31.

Pressure is then brought to bear on the blank to bring about adhesion between the registered coated portions thereof and to form the completed knock-down multi-cell carrier.

As is shown in FIGURE 16, the first and second handle reinforcing members 42, 44 will be located between the pair of primary handle panel members 31, 31a and in alignment with the vertical posts.

Figure 17:
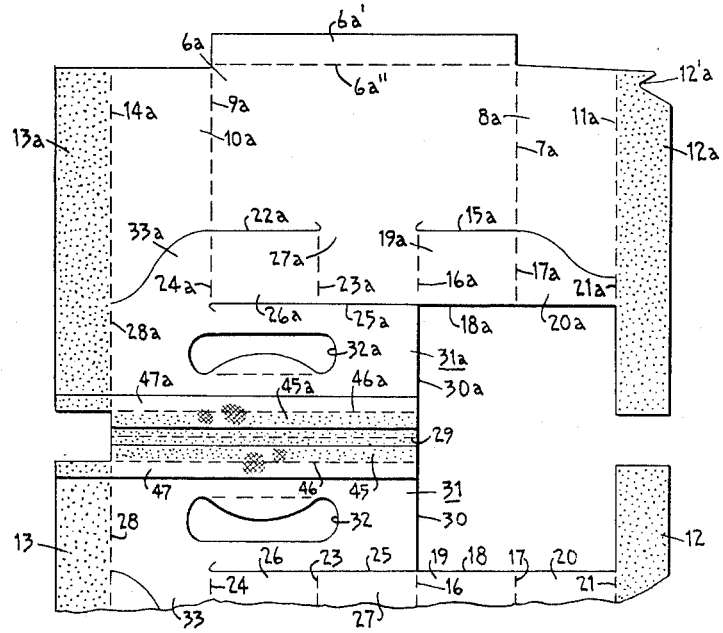
FIGURE 17 is a plan view of a portion of a fourth type of one-piece blank adapted to form a multi-cell carrier.
Figure 18:
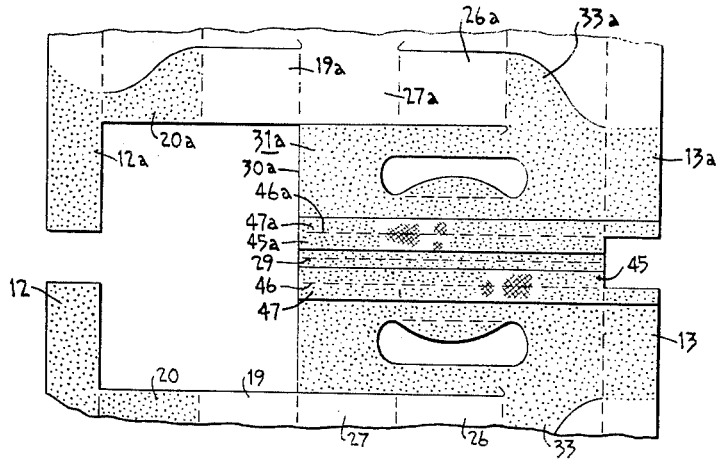
FIGURE 18 is a view similar to FIGURE 17 but showing the obverse face of the fourth type of one-piece blank.

A still further type of multi-cell carrier can be formed from the one-piece blank partially shown in FIGURES 17 and 18, which is substantially similar to the first type of one-piece blank shown in FIGURES 1 and 2, with the exception that the end flaps 12, 12a and 13, 13a are separated and are not integrally connected by the score lines 34, 35 as in the case of the first type of one-piece blank shown in FIGURE 1.

The pair of primary handle panel members 31, 31a are spaced apart and are indirectly connected together by means of a pair of spacing panels 45, 45a integrally connected together along a median score line 29, the spacing panel 45 being integrally connected to the primary handle panel member 31 along a common score line 46 whereas the spacing panel 45a is integrally connected to the primary handle panel member 31a along a common score line 46a.

As will be seen from FIGURES 17 and 18, a strip of reinforcement tape 47 passes over the upper and obverse faces of the first primary handle panel member 31, spacing panel 45, and end flap 13, adjacent to the score line 46. A further strip of reinforcement tape 47a also passes over the upper and obverse faces of the second primary handle panel member 31a, the spacing panel 45a and the end flap 13a. As will be seen from FIGURES 17 and 18, both the upper and obverse faces of the reinforcement strips 47, 47a and spacing panels are coated with pressure sensitive adhesive.

In forming the one-piece blank shown in FIGURES 17 and 18 to a knock-down multi-cell carrier, the end flaps 12, 12a are folded respectively, along the fold lines 11, 11a as has been described above in connection with the one-piece blank shown in FIGURES 1 and 2 and so that they partially overlie end panels 8, 8a and connecting upper panels 20, 20a. Concurrently, end wall panels 10, 10a are folded along the common score lines 9, 9a so that said end wall panels, as well as their end flaps 13, 13a, partially overlie the side wall panels 6, 6a as well as the primary handle panel members 31, 31a as is shown in FIGURE 19. In other words, the components will have assumed a position as described above and as shown in connection with FIGURE 4.

Thereafter, the spacing panel 45 is folded along the common score line 46 so that said spacing panel 45 and the strip of reinforcing tape 47 overlies and is in face-to-face contact with the upper portions of the end flaps 12, 13 and the first primary handle panel member 31, as is shown in FIGURE 19. Thereafter, the upper portion of the blank is folded along the common score line 46a so as to bring the second half of the blank into registry with the first half thereof. Finally, the sub-panel 1c of the bottom is folded along the medial score line 2 so that its coated strip 3 will be in registry with the coated surface of the tape 6a, pressure then being brought to bear upon the components so as to form the multi-cell carrier.

The fourth type of multi-cell carrier, i.e. formed by the blank shown in FIGURES 17 and 18, is shown in exploded condition in FIGURE 20.

Figure 22:
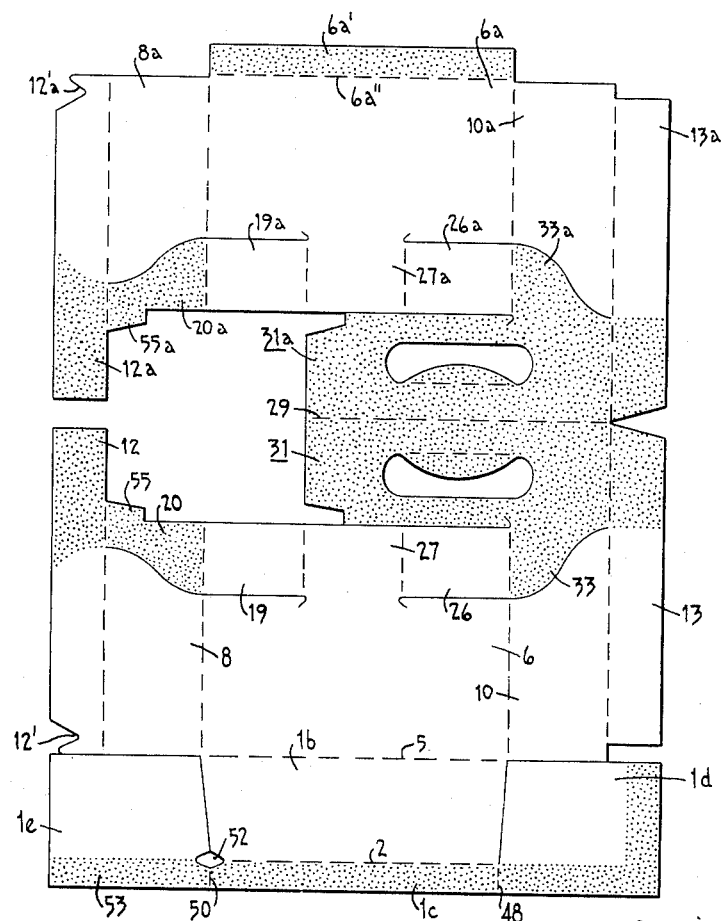
FIGURE 22 is a view similar to FIGURE 21 but showing the obverse face of the fifth type of one-piece blank.
Figure 21:
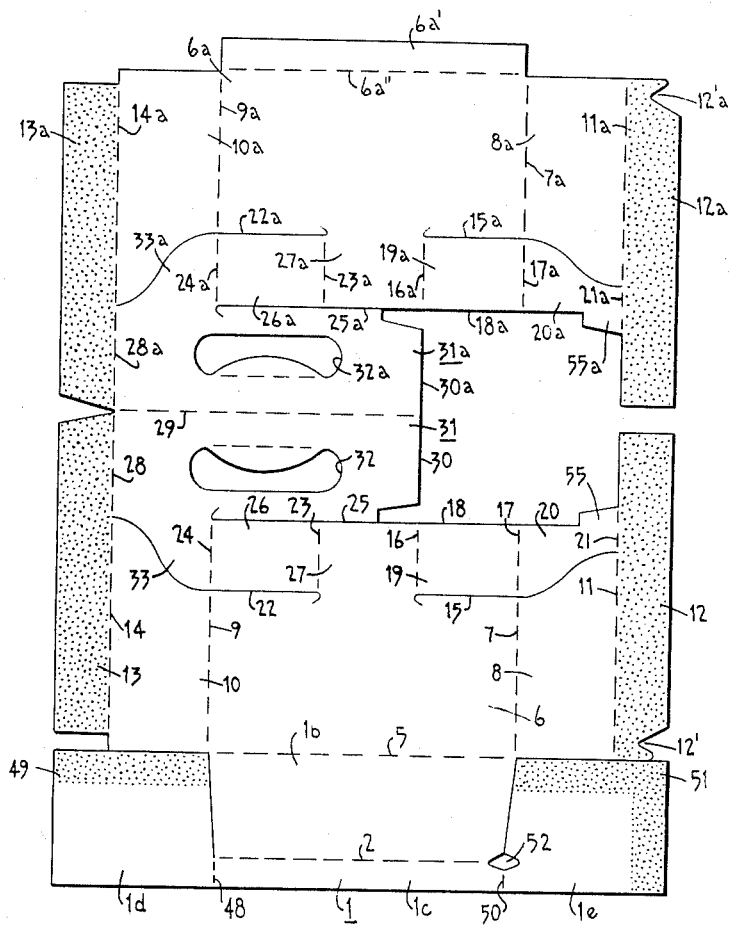
FIGURE 21 is a plan view of a fifth type of one-piece blank adapted to form a multi-cell carrier.

The fifth type of multi-cell carrier can be formed from the one-piece blank shown in FIGURES 21 and 22 which is extremely similar to the blank shown in FIGURES 1 and 2, with the exception that one end of bottom sub-panel 1c is, by means of a common fold line 48, integrally and hingedly connected to a sub-panel 1d provided with a strip of adhesive 49 on one face thereof as is shown in FIGURE 21. The other end of bottom sub-panel 1c is, by means of a common score line 50, integrally and hingedly secured to a bottom sub-panel 1e provided with an angulated strip 51 of pressure sensitive adhesive. Furthermore, a slot 52 is provided adjacent the juncture of the median line 2 with the score line 50, said slot 52 extending into bottom sub-panels 1b, 1c and 1e. As will be noted from FIGURE 22, the obverse face of bottom sub-panels 1e, 1c and 1b, is provided with a strip of pressure sensitive adhesive 53.

In forming the fifth type of one-piece blank shown in FIGURES 21 and 22 to a knock-down multi-cell carrier, the end flaps 13, 13a are respectively folded along their associated fold lines 14, 14a so that said flaps partially overlie the end walls 10, 10a and first and second primary handle panel members 31, 31a. Concurrently, end wall panels 8 and 8a are folded along their score line 7, 7a, so that, together with the end flaps 12, 12a, they overlie side walls 6, 6a, connecting members 20, 20a and the primary handle panel members 31, 31a. Similarly, bottom sub-panels 1e and 1d are folded, respectively, about their fold lines 50 and 48 so that they overlie bottom sub-panels 1b, 1c, bottom sub-panel 1e only being shown in this position in FIGURE 23 for the sake of clarity. It will be appreciated that the terminal end of bottom sub-panel 1d partially overlaps and is secured to bottom sub-panel 1e and that both of said bottom sub-panels 1d, 1e are adhesively secured to bottom sub-panel 1c.

When the blank has been folded as just described, a piece of reinforcement tape 54 of substantially H-shape is placed on the end flaps 12, 12a, 13, 13a as is shown in FIGURE 23, said piece of reinforcement tape being coated with pressure sensitive adhesive. Thereafter, the upper half of the blank is folded along the medial score line 29 so that the coated surface of flap 6a will be in registry with the coated portions 49, 51 of bottom sub-panels 1d and 1e respectively. Pressure is then brought to bear in order to bring about adhesion between the various integers of the multi-cell carrier.

The fifth type of multi-cell carrier is shown partially erected in FIGURE 24 and it will be see that, when the side walls bend along the common fold lines 5 and 6a" with respect to the bottom, the bottom sub-panels 1b to 1e will form an extremely strong load-bearing surface with the marginal side edges of bottom sub-panels 1d, 1e and the entire bottom sub-panel 1c partially overlying bottom sub-panel 1b.

As will be seen more clearly in FIGURES 21 and 22, each connecting panel member 20, 20a is, respectively, provided with an integral extension 55, 55a adjacent to the respective end flap 12, 12a. It will be appreciated that each connecting panel member shown in the first, second, third and fourth one-piece blank may, if desired, be provided with a similar integral extension.

The second to fifth embodiments, inclusive, of the multi-cell carrier again have the same advantages as the first embodiment. In other words, their respective connecting members 20, 20a are detachably adhesively secured together and each of the latter is coplanar with its associated primary handle panel member 31, 31a.

The upper horizontal, or selected, edge of each connecting member in the second to fourth embodiments extends parallel with, and adjacent to, a lower edge of the said adjacent primary panel member so that each said horizontal, or selected edge, will define a line of rupture. In the case of the fifth embodiment, that portion (see FIGURE 21) of the upper horizontal edge, contiguous with the upper edge of the transverse partitions 18, 18a, of each connecting member 20, 20a will extend parallel with, and adjacent to, a lower edge of the adjacent primary handle panel member whereby said horizontal, or selected, edge defines a line of rupture.

Hence, in the second to fifth embodiments, when each carrier is in erected condition and being carried, and upon movement of the contents of the carrier about the vertical axis of the latter, inertial torque will be resiliently taken up by each connecting member along its defined line of rupture thereby inhibiting rupture of the connections between the transverse partitions and the combined longitudinal partition and carrying handle.

Figure 26:
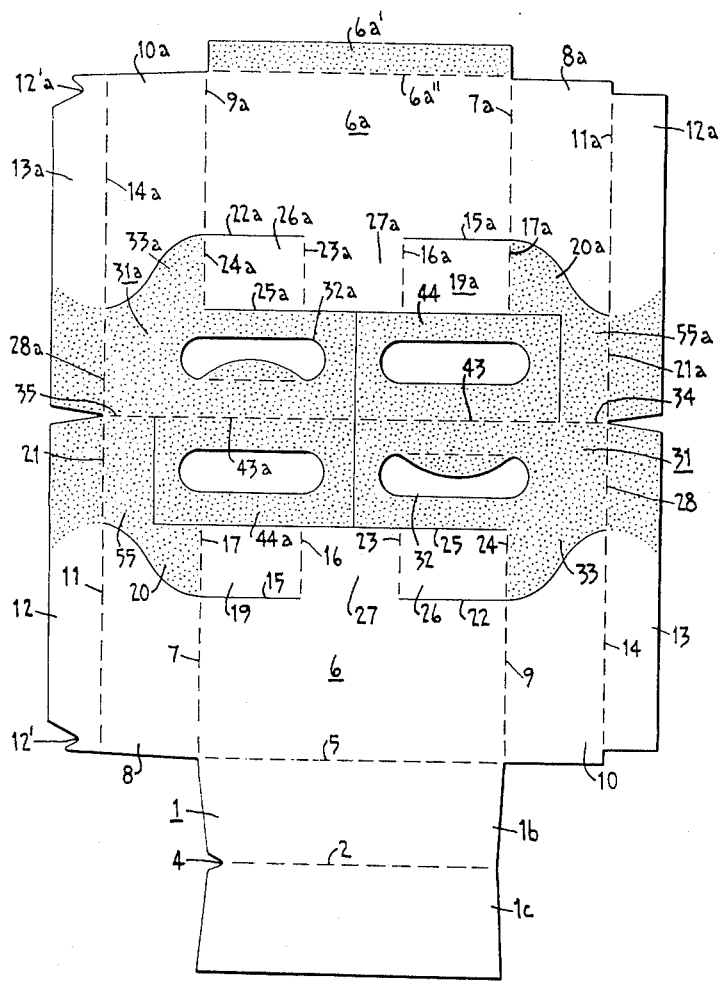
FIGURE 26 is a view similar to FIGURE 25 but showing the obverse face of the sixth type of one-piece blank.

A sixth type of multi-cell carrier can be formed from the type of one-piece blank shown in FIGURES 25 and 26 which is quite similar to the form of one-piece blank shown in FIGURES 1 and 2, with the exception that each primary handle member 31, 31a is integrally and hingedly connected, by means of a common score line 43, 43a respectively, to a handle reinforcing member 44, 44a. It will also be noted from FIGURES 25 and 26 that, as in the case of the fifth type of one-piece blank shown in FIGURES 21 and 22, each connecting panel member 20, 20a, is respectively, provided with an integral extension 55, 55a. Each connecting panel member 20, 20a shown in FIGURES 25 and 26, and its associated integral extension 55, 55a is, respectively, thereby integrally and hingedly connected to a transverse partition panel 19, 19a, an end flap 12, 12a and primary handle panel member 31, 31a.

Figure 27:
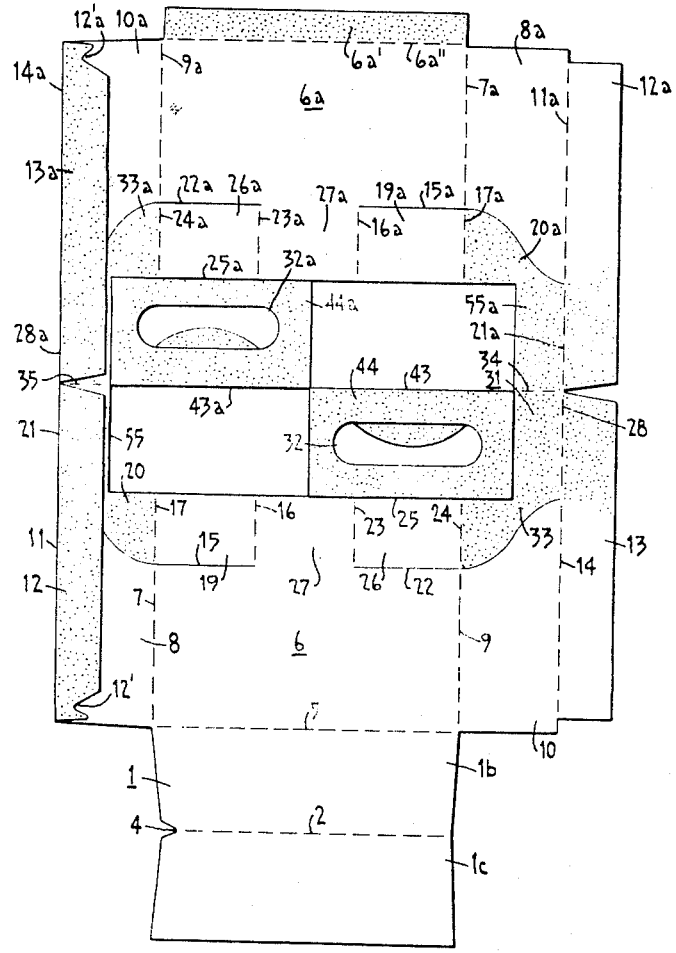

In forming the sixth type of one-piece blank shown in FIGURES 25 and 26 to a knock-down multi-cell carrier, the end flap 13a (as viewed in FIGURE 26), is firstly folded along the score line 14a so that it partially overlies end wall panel 10a and primary handle panel member 31a as is shown in FIGURE 27. Similarly, end flap 12 (as viewed in FIGURE 26) is folded along the score line 11 so that it partially overlies the end wall panel 8 and the extension 55 of connecting panel member 20, as is shown in FIGURE 27.

Thereafter, the handle reinforcing member 44a is folded along the score line 43a so that it overlies primary handle panel member 31a and, concurrently, handle reinforcing member 44 is folded along the score line 43 so that it overlies primary handle panel member 31, as is also shown in FIGURE 27.

Thereafter, as is shown in FIGURE 28, end wall panel 10 is folded along score line 9, and transverse partition panel member 26 is folded along the score lines 23 and 24 concurrently with end flap 13 folding about score line extension 28. Similarly, end wall panel 8a is folded about score line 7a, and transverse partition panel 19a is folded about score lines 16a, 17a, concurrently with end flap 12a folding about score line extension 21a. Such folding and hinging will bring the components of the sixth type of one-piece blank into the position shown in FIGURE 28 where, as it will be noted, the primary handle panel members 31, 31a and their respective reinforcing panel members 44, 44a are in alignment with one another and where the transverse partition panels 19a, 26, respectively, overlie the extension 27, 27a of their associated side wall panels 6, 6a.

It will be appreciated that all that is required to complete the one-piece blank to form a knock-down multi-cell carrier is that the bottom sub-panel 1c be folded along the medial score line 2 so that its coated strip 3 faces upwardly. Thereafter, the upper half of the blank shown in FIGURE 28 is folded along the medial score lines 44, 45 so that it overlies the lower half of said blank whereby the coated side of flap 6a' will be in registry with said coated strip 3 of bottom subpanel 1c. Pressure is then applied to the blank to bring about adhesion between the components.

Figure 29:
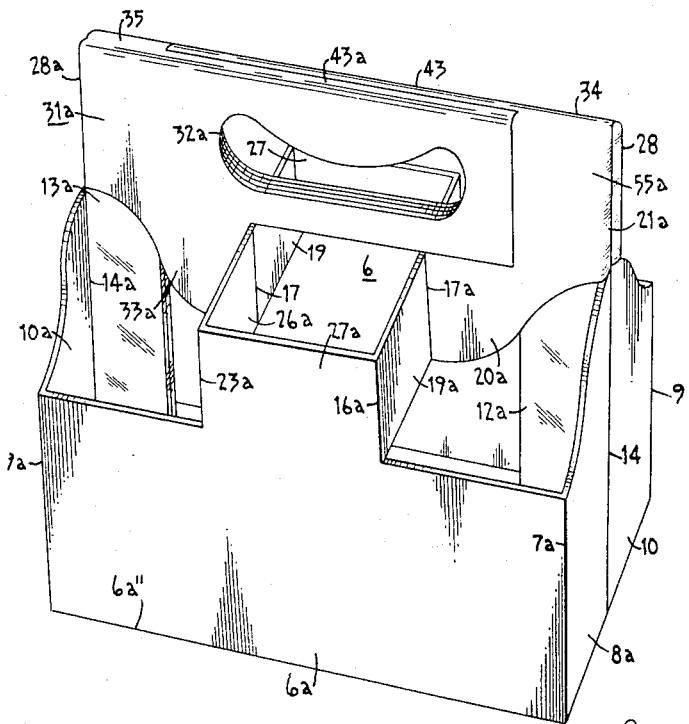
FIGURE 29 is a perspective view of the sixth type of multi-cell carrier shown in its erected condition.

The type of multi-cell carrier formed by the sixth type of one-piece blank of FIGURES 25 and 26 is shown in erected condition in FIGURE 29.

In the case of the sixth embodiment, the integral extensions 55, 55a of the connecting members 20, 20a will be detachably adhesively secured, respectively to the post members 12 and 12a and the remaining portion of each latter member will be detachably adhesively secured, respectively to the depending extensions 33, 33a of the primary handle panel members 31, 31a.

Thus, each connecting member 20, 20a will be coplanar with an adjacent primary handle panel member, connecting member 20a being, as is shown in FIGURE 29, coplanar with primary handle panel member 31a. Moreover the upper horizontal, or selected, edge of each connecting member will extend parallel with, and adjacent to, a lower edge of its said adjacent primary handle panel member such, for example, as connects member 20a and handle member 31a in FIGURE 29. Each said selected or horizontal edge will thus define a line of rupture.

Thus, in the sixth embodiment, on movement of the contents of the carrier about the vertical axis of the latter, inertial torque is resiliently taken up by each said connecting member 20, 20a along its defined line of rupture thereby inhibiting rupture of the connections between the transverse partitions and the combined longitudinal partition and carrying handle.

I claim:

1. A multi-cell carrier comprising a bottom; a pair of mutually opposed side walls each hingedly connected to an associated marginal side edge of said bottom; a pair of mutually opposed end walls each constituted by a pair of end wall panels each integrally and hingedly connected to an associated vertical terminal edge of an associated said side wall; first and second pairs of vertical post members, the members of each said pair being secured together; each said member of said pairs thereof being hingedly and integrally connected to an associated vertical terminal edge, remote from said associated side wall, of an associated said end wall panel; at least a pair of primary handle panel members each integrally and hingedly connected to an associated one of said first pair of vertical post members and secured in face-to-face contact therewith adjacent one end thereof; the members of each said pair of vertical post members being secured in face-to-face contact with one another and extending from adjacent the upper edge of the said primary handle panel members to substantially adjacent the lower edge of the said end wall panels; two pairs of spaced parallel transverse partitions; each said pair of transverse partitions, at one end thereof, being integrally and hingedly connected to an associated adjacent side wall adjacent the upper edge of the latter; the other end of one of said transverse partitions, in each pair thereof being integrally and hingedly connected to an associated said primary handle panel member; a pair of connecting members; one end of said connecting members being integrally and hingedly connected to the other end of the remaining transverse partition in each pair thereof; each said connecting member, at its other end, being integrally and hingedly connected to an associated one of said second pair of vertical post members; said secured pairs of vertical post members, said secured pair of primary handle panel members, and said secured connecting members thereby forming a combined longitudinal partition and carrying handle extending along, and adjacent to, the central longitudinal axis of the carrier; each said pair of transverse partitions extending normal to, and between, said combined longitudinal partition and carrying handle and an adjacent said side wall; each said connecting member being coplanar with an adjacent primary handle panel member and having a selected edge extending parallel with, and adjacent to, a lower edge of its said adjacent primary handle panel member, said selected edge defining a line of rupture; whereby, when said multi-cell carrier is being carried and upon movement of the contents of the carrier about the vertical axis of the latter, inertial torque is resiliently taken up by each said connecting member along its defined line of rupture thereby inhibiting rupture of the connections between the transverse partitions and the combined longitudinal partition and carrying handle.

2. A multi-cell carrier according to claim 1 wherein each said primary handle panel includes at least one hand-carrying aperture, and wherein said pair of connecting members are secured together.

3. A multi-cell carrier according to claim 1 including handle panel reinforcing means comprising at least one reinforcing member located between said pair of primary handle panel members.

4. A multi-cell carrier according to claim 1 wherein each said connecting member is detachably secured to an associated primary handle panel member which is opposed to, and parallel with, said adjacent primary handle panel member, each said primary handle panel member including at least one hand-carrying aperture, said carrier further including at least one handle panel reinforcing member located between said pair of primary handle panel members.

5. A multi-cell carrier according to claim 1 wherein said pair of connecting members are detachably adhesively secured together, each said primary handle panel member includes at least one hand-carrying aperture, and including a strip of reinforcing tape located between said pair of primary handle panel members.

6. A multi-cell carrier according to claim 1 wherein each said connecting member is detachably adhesively secured to an associated primary handle panel member which is opposed to, and parallel with, said adjacent primary handle panel member, each said primary handle panel member including at least one hand-carrying aperture, said carrier further including a pair of handle panel reinforcing members located between said pair of handle panel members.

7. A multi-cell carrier according to claim 1 wherein said pair of connecting members are detachably adhesively secured together, each said primary handle panel member includes at least one hand-carrying aperture, and including a pair of strips of reinforcing tape located between said pair of primary handle panel members.

8. A multi-cell carrier according to claim 1 wherein said pair of connecting members are detachably adhesively secured together, each said primary handle panel member includes at least one hand-carrying aperture, and including a pair of handle reinforcing members located between said pair of handle panel members, one of said reinforcing members being integrally and hingedly connected to the upper end of a selected one of said vertical post members, and the remaining reinforcing member being integrally and hingedly connected to a selected one of said primary handle panel members.

9. A multi-cell carrier according to claim 1 wherein said pair of connecting members are detachably adhesively secured together, each said primary handle panel member includes at least one hand-carrying aperture, and including a pair of handle reinforcing members located between said pair of handle panel members, a selected one of said reinforcing members being integrally and hingedly connected to a selected one of said primary handle panel members.

10. A multi-cell carrier according to claim 1 wherein said pair of connecting members are detachably adhesively secured together, each said primary handle panel member includes at least one hand-carrying aperture, and including a pair of handle reinforcing members located between said pair of handle panel members, each said reinforcing member being integrally and hingedly connected along a common upper edge, to an associated primary handle panel member.

11. A one-piece blank adapted to form a multi-cell carrier, said carton being cut and scored to provide:
(a) a pair of side wall panels, each end of each said panel being integrally and hingedly connected to
(b) an associated end wall panel;
(c) an end flap integrally and hingedly connected to each said end wall panel, remote from the associated side wall panel; each said end wall panel being adapted, upon hinging with respect to its said associated side wall panel, to extend normal thereto, and each said end flap being adapted, upon hinging with respect to its said associated end wall panel on erection of the carrier, to extend normal thereto and parallel with and spaced from the associated side wall panel; adjacent pairs of said end flaps being adapted to be secured together and, upon said erection, to extend along and adjacent to the central longitudinal axis of the carrier;
(d) a pair of primary handle panel members each integrally and hingedly connected to an associated one of a selected pair of said end flaps and adapted to be secured together in face-to-face contact and to be secured in face-to-face contact with said pairs of end flaps and, upon said erection, to extend along and adjacent to the said central longitudinal axis;
(e) two pairs of transverse partition panels, a selected one of each said pair being integrally and hingedly connected, at one end thereof, to an associated said primary handle panel and, at its other end, being integrally and hingedly connected to an associated said side wall panel, each said selected one transverse partition panel being adapted, upon hinging with respect to its associated primary handle panel and side wall panel, and upon said erection, to extend normal to, and between, said last-mentioned pair of panels;
(f) a pair of connecting member panels each integrally and hingedly connected at one end to an associated one of the other pair of end flaps, the remaining end of each said connecting member panel being integrally and hingedly connected to one end of the remaining one transverse partition panel in each pair thereof; the other end of each said remaining one transverse partition panel being integrally and hingedly connected to the same side wall panel connecting the selected one transverse partition; each upper edge of said connecting panel member measured from the hinged transverse partition panel connection toward the associated end flap, being of complementary construction though physically removed from the lower adjacent edge of the adjacent primary handle panel member, and adapted to meet with and lie in the same plane as the lower adjacent edge of the adjacent primary handle panel member upon construction of the carton; each said remaining one transverse partition being adapted, upon hinging with respect to its associated connecting member panel and side wall panel, and upon said erection, to extend normal to, and between, said last-mentioned pair of panels; each said connecting member panel being adapted, upon hinging with respect to its associated end flap and remaining one transverse partition, and upon said erection, to extend along and adjacent to the said central longitudinal axis; said pairs of connecting member panels, end flaps, and primary handle panel members, upon said erection, forming a combined longitudinal partition and carrying handle extending along and adjacent to said longitudinal axis; and to be coplanar with an adjacent primary handle panel member and having a selected edge extending parallel with, and adjacent to, a lower edge of its said adjacent primary handle panel member, said selected edge defining a line of rupture; and (g) a bottom panel having a pair of mutually opposed side edges at least one of which is integrally and hingedly connected to a selected one of said side wall panels; said side wall panel being adapted, upon hinging with respect to said bottom panel, and upon said erection, to extend normal to the latter; the remaining side wall panel, also being hingedly connected to said bottom and, upon said erection extending normal to the latter; whereby (h) when said carrier is in said erected condition and being carried, and upon movement of the contents of the carrier about the vertical axis of the latter, inertial torque is resiliently taken up by each said connecting member along its defined line of rupture thereby inhibiting rupture of the connections between the transverse partitions and the combined longitudinal partition and carrying handle.

12. A one-piece blank according to claim 11 wherein said primary handle panel members are integrally and hingedly connected together along a common score line and wherein at least a selected said pair of end flaps is integrally and hingedly connected together along a common score line.

13. A one-piece blank according to claim 11 wherein each said primary handle panel is integrally and hingedly connected to an associated spacing panel, said spacing panels being integrally and hingedly connected together along a common score line, and wherein said end flaps of each pair thereof are separate and distinct from one another.

14. A one-piece blank according to claim 11 wherein said remaining side wall panel is integrally and hingedly connected to a flap adapted to be secured to said bottom panel.

15. A one-piece blank according to claim 11 wherein the upper end of a selected one of said end flaps is integrally and hingedly connected to a handle reinforcing panel, and a selected one of said primary handle panel members is integrally and hingedly connected to a further handle reinforcing panel, each of said handle reinforcing panels, upon formation of said carrier, being in alignment and secured in face-to-face contact with one another, said aligned pair of handle reinforcing panels being located between and secured in face-to-face contact with said pair of primary handle panel members.

16. A one-piece blank according to claim 11 wherein a selected primary handle panel is provided with a flap integrally and hingedly connected thereto and adapted, upon formation of the carrier, to be united to the other primary handle panel.

17. A one-piece blank according to claim 11 wherein both said side wall panels are integrally and hingedly connected to an associated marginal side edge of said bottom.

18. A one-piece blank according to claim 11 including a pair of handle reinforcing panels integrally and hingedly connecting together and adapted to be secured together in face-to-face contact with one another, a selected one of said handle reinforcing panels being integrally and hingedly connected to a selected one of said primary handle panels; said handle reinforcing panels, upon formation of the carrier, being located between and secured to said pair of primary handle panels.

19. A one-piece blank according to claim 11 wherein a selected primary handle panel is provided with a flap integrally and hingedly connected thereto and adapted, upon formation of the carrier, to be united to the other primary handle panel.

20. A one-piece blank according to claim 11 wherein both said side wall panels are integrally and hingedly connected to an associated marginal side edge of said bottom.

21. A one-piece blank according to claim 11 including a pair of handle reinforcing panels each integrally and hingedly connected to an associated said primary handle panel; said handle reinforcing panels, upon formation of the carrier, being located between and secured in face-to-face contact with, said pair of primary handle panels.

22. A one-piece blank according to claim 11 wherein said primary handle panel members are integrally and hingedly connected together along a common score line, at least a selected said pair of end flaps are integrally and hingedly connected together along a common score line, and said remaining side wall panel is integrally and hingedly connected to a flap adapted to be secured to said bottom panel.

23. A one-piece blank according to claim 11 wherein each said primary handle panel member is integrally and hingedly connected to an associated spacing panel, said spacing panels are integrally and hingedly connected together along a common score line, said end flaps of each pair thereof are separate and distinct from one another, and said remaining side wall panel is integrally and hingedly connected to a flap adapted to be secured to said bottom panel.

24. A one-piece blank according to claim 11 wherein said primary handle panel members are integrally and hingedly connected together along a common score line, at least a selected said pair of end flaps is integrally and hingedly connected together along a common score line, and a selected primary handle panel is provided with a flap integrally and hingedly connected thereto and adapted, upon formation of the carrier, to be united to the other primary handle panel member.

25. A one-piece blank according to claim 11 wherein the upper end of a selected one of said end flaps is integrally and hingedly connected to a handle reinforcing panel, a selected one of said primary handle panel members is integrally and hingedly connected to a further handle reinforcing panel, each of said handle reinforcing panels, upon formation of said carrier, being in alignment and secured in face-to-face contact with one another, said aligned pair of handle reinforcing panels being located between and secured in face-to-face contact with said pair of primary handle panel members, and wherein both said side wall panels are integrally and hingedly connected to an associated marginal side edge of said bottom.

26. A one-piece blank according to claim 11 including a pair of handle reinforcing panels integrally and hingedly connected together and adapted to be secured together in face-to-face contact with one another, a selected one of said handle reinforcing panels being integrally and hingedly connected to a selected one of said primary handle panels; said handle reinforcing panels, upon formation of the carrier, being located between and secured to said pair of primary handle panels; and wherein a selected primary handle panel is provided with a flap integrally and hingedly connected thereto and adapted, upon formation of the carrier, to be united to the other primary handle panel member.

27. A one-piece blank according to claim 11 including a pair of handle reinforcing panels integrally and hingedly connected together and adapted to be secured together in face-to-face contact with one another, a selected one of said handle reinforcing panels being integrally and hingedly connected to a selected one of said primary handle panels; said handle reinforcing panels, upon formation of the carrier, being located between and secured to said pair of primary handle panels; and wherein both said side wall panels are integrally and hingedly connected to an associated marginal side edge of said bottom.

28. A one-piece blank according to claim 11 wherein a selected primary handle panel is provided with a flap integrally and hingedly connected thereto and adapted, upon formation of the carrier, to be united to the other primary handle panel, and wherein both said side wall panels are integrally and hingedly connected to an associated marginal side edge of said bottom.

References Cited by the Examiner
UNITED STATES PATENTS

| | | | |
|---|---|---|---|
| 2,692,700 | 10/54 | Kowal | 220—113 |
| 2,776,072 | 1/57 | Forrer | 220—113 |
| 2,957,602 | 10/60 | Ryder | 220—113 |
| 3,017,054 | 1/62 | Forrer | 220—113 |
| 3,029,977 | 4/62 | Arneson | 220—113 |
| 3,037,662 | 6/62 | Gish | 220—115 |

JOSEPH R. LECLAIR, *Primary Examiner.*

FRANKLIN T. GARRETT, *Examiner.*